(12) United States Patent
Kong

(10) Patent No.: US 8,249,619 B2
(45) Date of Patent: Aug. 21, 2012

(54) METHODS AND APPARATUSES FOR USE IN MOBILE DEVICE POSITIONING SYSTEMS

(75) Inventor: Seung Hyun Kong, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 769 days.

(21) Appl. No.: 12/246,979

(22) Filed: Oct. 7, 2008

(65) Prior Publication Data

US 2010/0087205 A1    Apr. 8, 2010

(51) Int. Cl.
*H04W 24/00* (2009.01)
(52) U.S. Cl. ............... 455/456.1; 455/456.2; 455/456.6
(58) Field of Classification Search .................. None
See application file for complete search history.

(56) References Cited

U.S. PATENT DOCUMENTS

| 6,504,503 | B1 | 1/2003 | Saint-Hilaire et al. |
| 7,084,809 | B2 | 8/2006 | Hockley, Jr. et al. |
| 2002/0168989 | A1* | 11/2002 | Dooley et al. ............ 455/456 |
| 2005/0206566 | A1 | 9/2005 | Stilp et al. |

FOREIGN PATENT DOCUMENTS

| WO | WO02082850 A1 | 10/2002 |
| WO | WO2004008171 | 1/2004 |

OTHER PUBLICATIONS

International Search Report and Written Opinion—PCT/US2009/059842—ISA/EPO—Mar. 8, 2010.

* cited by examiner

*Primary Examiner* — Erika Gary
(74) *Attorney, Agent, or Firm* — Thien T. Nguyen

(57) ABSTRACT

Methods and apparatuses are provided which may be adapted for use in and/or with mobile device positioning systems and/or the like. In an example, a method may include accessing a plurality of measurements associated with a plurality of location signals as received by the mobile device from at least a first portion of a plurality of transmitters. The method may include dynamically establishing at least one location signal transmission parameter based, at least in part, on the plurality of measurements. The location signal transmission parameter(s) may be adapted for use by at least a second portion of the plurality of transmitters to operatively initiate subsequent transmission of an additional plurality of location signals adapted to be received by the mobile device.

63 Claims, 8 Drawing Sheets

METHODS AND APPARATUSES FOR USE IN MOBILE DEVICE POSITIONING SYSTEMS

BACKGROUND

1. Field

The subject matter disclosed herein relates to electronic location detection, and more particularly to methods and apparatuses for use in wireless communication networks.

2. Information

Wireless mobile computing and/or communication devices (mobile devices) continue to shape our world. One of the benefits of using some mobile devices is that the location of the mobile device, and hopefully the user, may be determined or otherwise estimated. For example, locating a user during an emergency would clearly be useful to those seeking to respond to the emergency.

Accordingly, mobile device positioning systems have been implemented to determine or otherwise estimate the location of a mobile device. Indeed, in certain regions, governmental regulations often mandate that wireless networks be adapted to provide such positioning systems. By way of example, wireless phone networks may include location based services (LBS) or the like to provide such positioning systems to meet emergency 911 (E911) requirements for mobile phones.

For example, certain wireless networks implement a mobile positioning system known as assisted-GPS (A-GPS), which may use an embedded global positioning system (GPS) chipset within the mobile device that is adapted to perform advanced forward link trilateration (AFLT) based on measurements of pilot signals transmitted from multiple base stations. Such base stations may be synchronized with GPS time.

SUMMARY

In accordance with an exemplary implementation, a method may be provided for use in a mobile device positioning system. The method may include accessing a plurality of measurements associated with a plurality of location signals as received by the mobile device from at least a first portion of a plurality of transmitters. The method may include dynamically establishing at least one location signal transmission parameter based, at least in part, on the plurality of measurements. The location signal transmission parameter(s) may be adapted for use by at least a second portion of the plurality of transmitters to operatively initiate subsequent transmission of an additional plurality of location signals adapted to be received by the mobile device.

In accordance with another exemplary implementation, an apparatus may be provided for use in a mobile device positioning system. The apparatus may include memory adapted to store a plurality of measurements associated with a plurality of location signals as received by a mobile device from at least a first portion of a plurality of transmitters. The apparatus may also include at least one processing unit that may be coupled to the memory and adapted to dynamically establish at least one location signal transmission parameter based, at least in part, on the plurality of measurements. Here, for example, the location signal transmission parameter(s) may be adapted for use by at least a second portion of the plurality of transmitters to operatively initiate subsequent transmission of an additional plurality of location signals adapted to be received by the mobile device.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Figure 1:
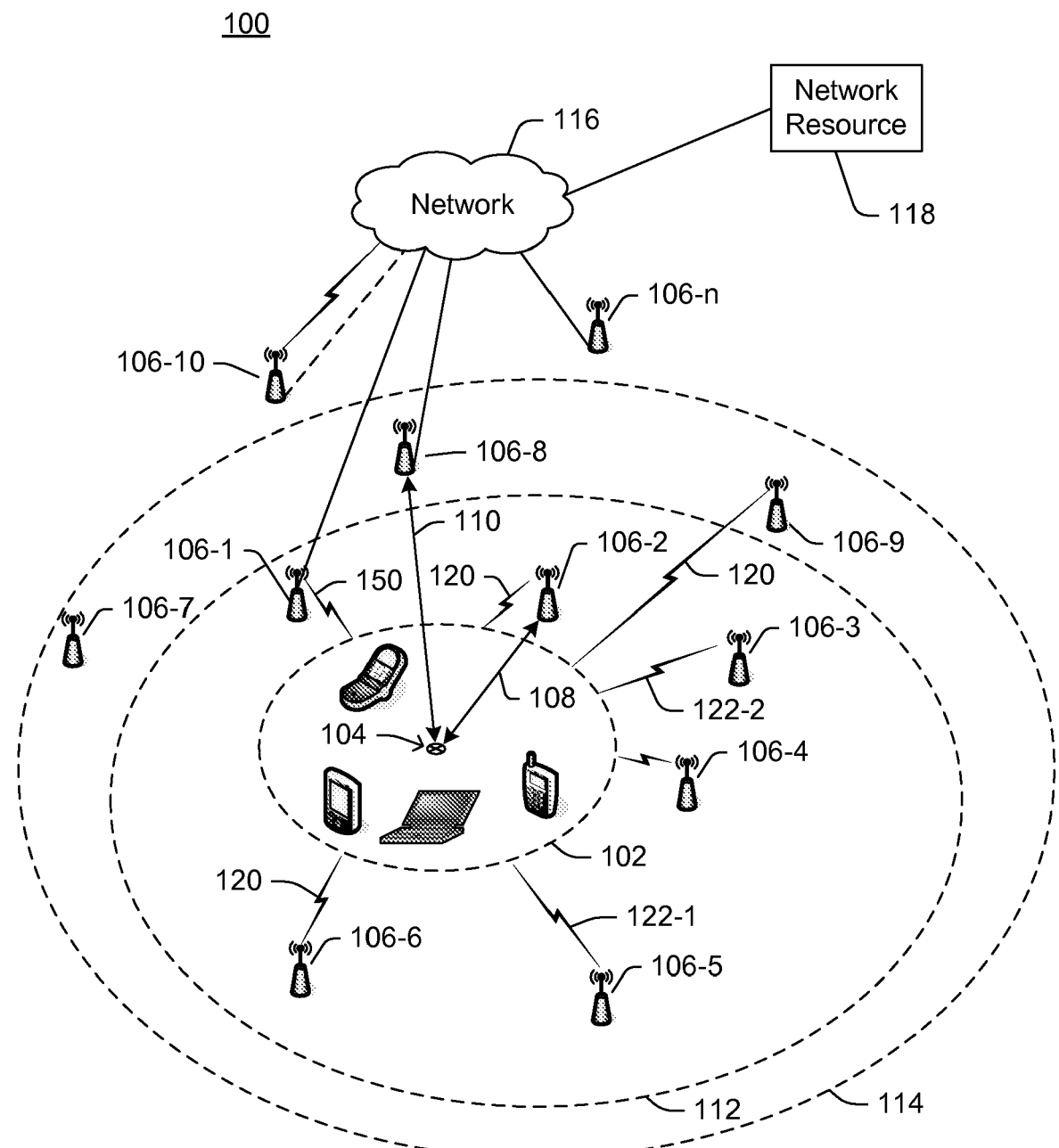
FIG. 1 is block diagram illustrating an exemplary mobile device positioning system, in accordance with an implementation.

In accordance with certain aspects of the present description, certain exemplary techniques are provided which may be implemented in systems, apparatuses and/or methods to provide mobile device positioning in which dynamic operative adjustments may be introduced to increase the efficiency and/or accuracy of locating a mobile device. As described herein, more accurate location estimates may be provided by operatively controlling subsequent transmissions of location signals, and more particularly by attempting to optimize the number and/or operation of certain transmitters that may be adapted to transmit such location signals to a mobile station. By way of example but not limitation, such techniques may be adapted for use in mobile device positioning systems that transmit Highly Detectable Pilot (HDP), Idle Period Down Link (IPDL) pilot, and/or other like signals. Such techniques may be adapted for use in other spread spectrum systems, or the like.

As mentioned, one of the benefits of using some mobile devices is that the location of the mobile device may be determined or otherwise estimated using mobile device positioning systems.

Certain mobile positioning systems may implement an Observed Time Difference of Arrival (O-TDOA) technique. For example, a universal mobile telecommunication system (UMTS) may use O-TDOA. Such an O-TDOA system may use measurements of pilot signals from multiple base stations that may not be time synchronized. As such, an O-TDOA system may also be associated with other types of measurements to account for the unsynchronized timing of the base stations.

Since base stations may transmit signals continuously within the same frequency band, a mobile device may receive a plurality of down link signals simultaneously within the same frequency band. Unfortunately, if a mobile device that is located relatively close to a service base station (e.g., a base station currently providing services to the mobile station) attempts to detect "location signals" from one or more base stations located farther away, the mobile device may experience significant signal interference from the service base station. Such interference may lead to, or otherwise add to, a "hearability problem" in certain code division multiple access (CDMA) systems, such as, e.g., IS-95 spread spectrum communication systems.

An Idle Period Down Link (IPDL) technique has been developed to help address such hearability problems for O-TDOA systems in a UMTS. Here, for example, an IPDL operation may be implemented to allow base stations to periodically pause or stop (idle) down link transmissions for a period of time such that a mobile device may attempt to receive location signals from other base stations. For example, an IPDL operation may specify a 0.625 msec long idle period that may allow a mobile device within a cell area of a base station to attempt to receive and measure location signals from other base stations. Such an IPDL operation may be implemented in all or portions of the base stations and provide for the various base stations to idle their respective down link signal transmissions in accordance with a random or substantially random schedule but with fixed operation frequency.

Other techniques that have been developed to help address hearability problems include, for example, selectively transmitting a highly detectable pilot (HDP) signal. Such an HDP operation may be implemented, for example, in an enhanced AFLT-like positioning system. Here, for example, a base station may be adapted to selectively transmit an HDP signal or stop its transmission according to a signal transmission operation schedule. Such an HDP may be adapted and transmitted in a manner that increases the ability of a mobile device to receive and measure such a signal even if transmitted from a base station farther away.

In certain situations and/or environments, the fixed length of the idle period and/or frequency of operation associated with an IPDL system may not be as effective as it might be in other environments. Likewise, the fixed length of the HDP signal and/or the frequency of operation associated with an HDP system may be less effective in certain situations and/or environments.

In certain O-TDOA, and/or HDP systems, a mobile device may be adapted to measure a code phase and a (relative) signal strength of all detected location signals (e.g., pilot signals or channels). The mobile device may provide such measurements to at least one network resource, such as, e.g., a position estimation calculation server or the like. The network resource may be adapted to estimate or otherwise calculate a location of the mobile device using a base station almanac or other like information. In other implementations, such a mobile device may be adapted to estimate or otherwise calculate its own location using a base station almanac or other like information. Here, for example, a base station or other network resource may provide the base station almanac or other like information to the mobile device. Regardless as to which device or devices are adapted to estimate or otherwise calculate a location of the mobile device, the relative signal strength measurement may include a ratio of the power of specific pilot channel to a total power of all received channels by the mobile device. While such a measured relative signal strength may serve as a reasonable indicator of a signal quality for an AFLT system, such measured relative signal strength may not be as reasonable an indicator of a signal quality for HDP and/or IPDL in certain situations and/or environments.

Consequently, in accordance with certain aspects of the present description, certain exemplary techniques are provided which may be implemented in a mobile device positioning system to allow for dynamic operative adjustments that may increase the efficiency of the mobile device positioning system. Such exemplary techniques may provide for more accurate location estimates by operatively controlling subsequent transmissions of location signal through dynamic operative adjustments. By way of example but not limitation, such techniques may be adapted for use in mobile device positioning systems that transmit HDP and/or IPDL pilot signals. Such techniques may be adapted for use in other spread spectrum systems, or the like.

The mobile device positioning systems described herein may be used for various wireless communication networks such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be used for any combination of WWAN, WLAN and/or WPAN.

In one or more exemplary implementations, the functions described may be implemented in hardware, software, firmware, or any combination thereof. If implemented in software, the functions may be stored on or transmitted over as one or more instructions or code on a computer-readable medium. Computer-readable media may include both computer storage media and communication media including any medium that facilitates transfer of a computer program from one place to another. A storage media may be any available media that may be accessed by a computing device. By way of example but not limitation, such computer-readable media may include RAM, ROM, EEPROM, CD-ROM or other optical disk storage, magnetic disk storage or other magnetic storage devices, or any other medium that can be used to carry or store desired program code in the form of instructions or data structures and that can be accessed by a computing device. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, blu-ray disc, and/or the like, where disks usually store/reproduce data magnetically, while discs store/reproduce data optically with lasers. Combinations of the above may also be included within the scope of a computer-readable medium.

Attention is now directed to FIG. 1, which is a block diagram illustrating an exemplary mobile device positioning system 100. As shown, mobile device positioning system 100 may include a mobile device 102 that may be adapted to communicate with one or more other devices through wireless signals transmitted over one or more wireless communication links. For example, mobile device 102 may communicate with one or more devices, which are represented by a plurality of network based transmitters (transmitters 106-1, ..., 106-n). By way of example but not limitation, one or more transmitters 106 may include or otherwise be operatively associated with a base station or other like communication node. Thus, while the term "transmitter" is used to describe such devices it should be understood that in certain implementations of such devices may be adapted to receive wireless signals too (e.g., using a receiver and/or transceiver). For example, a wireless communication link 150 is shown to connect mobile device 102 with transmitter 106-1. Wireless communication link 150 may provide for up link and/or down link communications.

Wireless device 102 is illustrated in FIG. 1 using a dashed-line oval surrounding a variety of exemplary device icons including a mobile phone, a personal digital assistant (PDA), a portable laptop computer, and a radio device. These visual icons are meant to illustrate that mobile device 102 may take on a variety of forms. These icons are just a few examples. Thus, claimed subject matter should not be limited to such examples. Mobile device 102 may include any device or devices that may be adapted to communicate using wireless signals.

A location 104 of mobile device 102 is also shown within the dashed-line oval in FIG. 1. Here, for example, location 104 may be an actual physical location and/or an estimated location. As shown, location 104 may be separated from transmitter 106-8 by a first distance 110 and from transmitter 106-2 by a second distance 108. In certain implementations, for example as illustrated in FIG. 1, first distance 110 may be greater than second distance 108. In other implementations, first distance 110 and second distance 108 may be substantially the same, and/or first distance 110 may be less than second distance 108. In certain implementations, it may be useful for mobile device 102 to receive location signals from transmitters that may be located closer to location 104.

As used herein, the term "location signal" is intended to include any wireless signal or signals that may be used in some manner to determine or otherwise estimate a position and/or location of mobile device. For example, a location signal may be used to determine or otherwise estimate a distance, range, pseudorange, etc., between the transmitter that transmitted the location signal and the mobile device and/or relative distance, relative range, relative pseudorange, etc., between the transmitters that transmitted the location signals. By way of example but not limitation, certain location signals may include a pilot signal that may be adapted for such use.

In certain example implementations, each of the transmitters 106-1, ..., 106-n (where n is an integer) may be further coupled to a network 116 through one or more wired and/or wireless links, and/or other communication resources. To illustrate such connectively in FIG. 1, transmitters 106-1, 106-8, 106-10, and 106-n are shown as being connected to network 116. Additionally, transmitter 106-10 is illustrated as being connected through a wireless communication link to network 116.

Network 116 may include one or more resources (e.g., devices, services, functions, infrastructure, etc.) that may be adapted to allow devices connected thereto to communicate in some manner. By way of example but not limitation, transmitter 106-10 may communicate with transmitter 106-n through network 116, and/or mobile device 102 may communicate through transmitter 106-1 and network 116 with one or more devices such as, e.g., a network resource 118. Those skilled in the art will recognize that network 116 may be adapted to provide connectivity to other devices and/or networks (not shown) external to mobile device positioning system 100.

Network resource 118 in FIG. 1 may be representative of any device or devices that may be adapted to provide and/or otherwise support one or more functions associated with the methods, apparatuses and/or systems provided herein. By way of example but not limitation, network resource 118 may include one or more computing devices, such as, e.g., one or more server devices.

As illustrated in FIG. 1, the plurality of transmitters 106-1, ..., 106-n may be subdivided into two or more portions. Such portions may be differentiated or otherwise logically identified based on the differences in operation, location, etc., of their respective transmitters. By way of example, in FIG. 1, a first portion 114 is illustrated by a dashed-line oval that surrounds transmitters 106-1 through 106-9, and second portion 112 is illustrated by a dashed-line oval that surrounds transmitters 106-1 through 106-6. Thus, in this example, second portion 112 is a subset of first portion 114, which is a subset of the plurality of transmitters 106-1, ..., 106-n. In other example implementations, first portion 114 may be a subset of second portion 112, first portion 114 and second portion 112 may overlap, or first portion 114 and second portion 112 may be mutually exclusive.

As described herein, in certain example implementations, first portion 114 may include certain transmitters adapted to transmit location signals 120 that may be detected by mobile device 102, while second portion 112 may include certain transmitters that subsequently transmit additional location signals 122 that may be detected by mobile device 102 following the dynamic establishment (adjustment) of at least one location signal transmission parameter as provided herein. In FIG. 1, for example, some location signals 120 are illustrated as being transmitted by transmitters 106-2, 106-6 and 106-9 to mobile device 102. Some additional location signals 122-1 and 122-2 are illustrated in FIG. 1 as being transmitted by transmitters 106-5 and 106-3, respectively, to mobile device 102.

Figure 2:
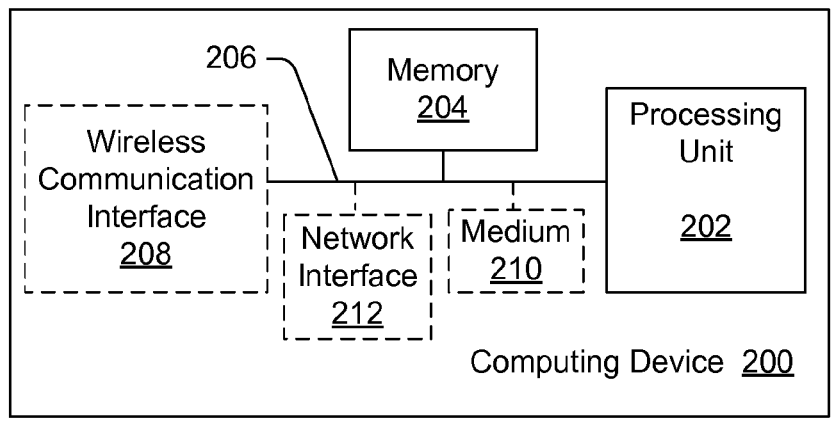
FIG. 2 is block diagram illustrating an exemplary computing device that may be adapted for use in a mobile device positioning system.

Attention is now directed to FIG. 2 which is a block diagram illustrating a computing device 200 that may be adapted for use (and/or otherwise implemented in whole or part) in one or more of the devices in mobile device positioning system 100. By way of example but not limitation, all or part of computing device 200 may be implemented in mobile device 102, one or more of transmitters 106-1, ..., 106-n, and/or network resource 118.

It should be recognized that the techniques described herein may be implemented by various means depending upon applications according to particular features and/or examples. For example, such techniques may be implemented in hardware, firmware, software, and/or combinations thereof.

With this in mind, by way of example but not limitation computing device 200 may include one or more processing units 202. Here, for example, processing unit 202 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

Processing unit 202 may be operatively coupled to a memory 204, for example through one or more buses 206 or the like. Memory 204 may include any type of memory that may be adapted to store information in the form of data. Some examples include a random access memory (RAM), a read only memory (ROM), a static memory, a dynamic memory, etc. Such stored information may include, for example, instructions that may be implemented by processing unit 202, and/or data associated with communications, location signals, measurements, parameters, location data, and/or the like. Such information may be stored on a computer readable medium 210 which may be operatively coupled to computing device 200. Computer readable medium 210 may include some form of memory, one or more optical data storage discs, one or more magnetic storage disks or tapes, etc.

Computing device 200 may also include one or more interfaces that may be adapted to support communications. For example, a network interface 212 may be coupled to processing unit 202 and/or memory 204 and adapted to provide communication with one or more other devices through a network (e.g., network 116) or other like communication resource. For example, a wireless communication interface 208 may be coupled to processing unit 202 and/or memory 204 and adapted to provide wireless communication with one or more other devices. Here, for example, wireless communication interface 208 may be adapted to receive location signals and take measurements thereof or otherwise support processing unit 202 to take measurements thereof. For example, as described herein, in certain implementations such location signals may include a pilot signal or channel from which such (relative) signal strength and/or code phase measurements may be taken.

Figure 3:
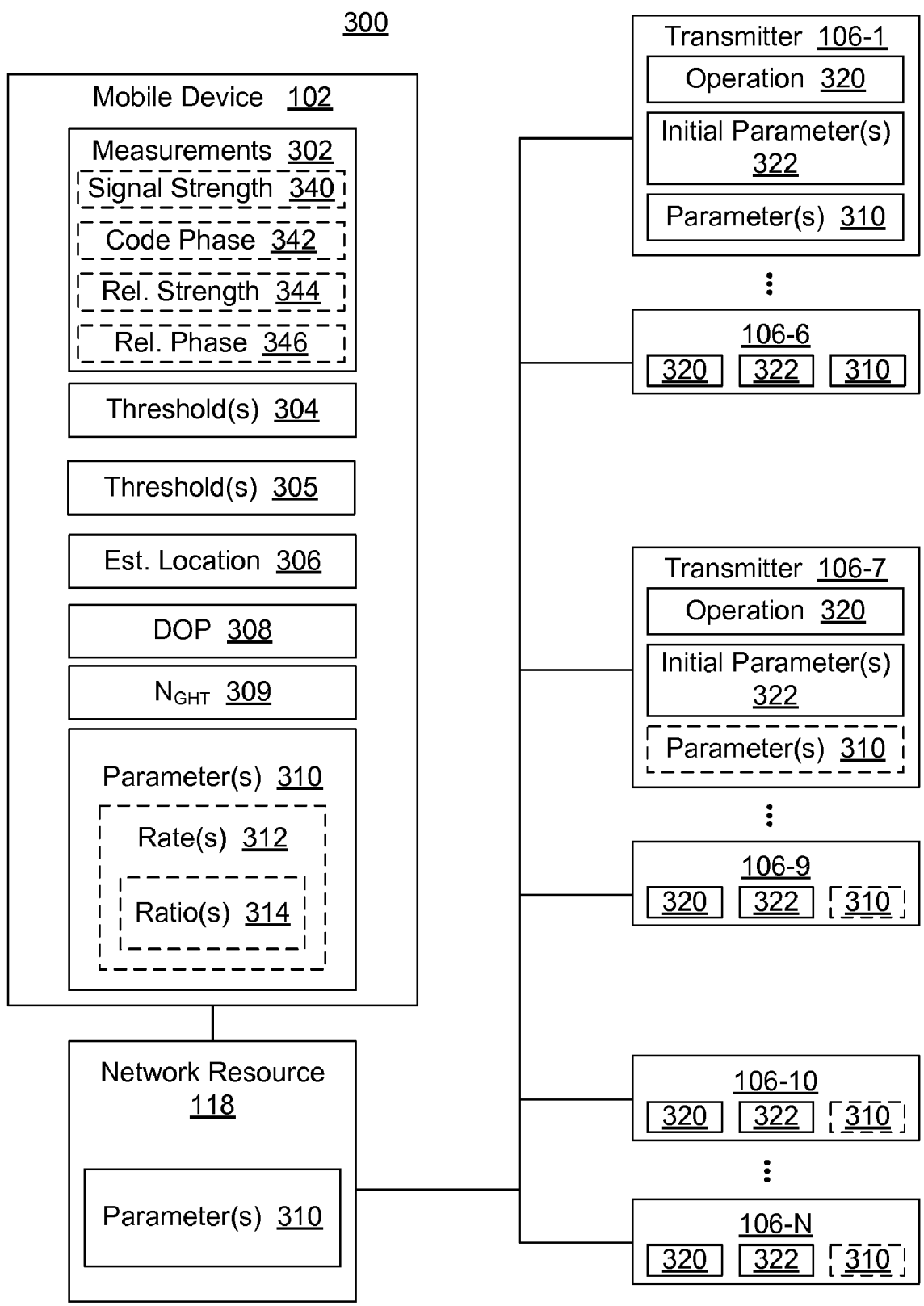
FIG. 3 is block diagram illustrating an exemplary mobile device positioning system having a mobile device adapted to support certain mobile device positioning processes, in accordance with an implementation.

Attention is now directed to FIG. 3, which is a block diagram illustrating a system 300 that may be an implementation of mobile device positioning system 100. In this example, system 300 includes mobile device 102 which may be coupled to network resource 118. Network resource 118 may be further coupled to transmitters 106-1, ..., 106-n.

In this example implementation mobile device 102 may include a computing device 200 or the like, which may be adapted to perform several functions and/or processes. For example, as illustrated in FIG. 3, mobile device 102 may be adapted to produce measurements 302 based, at least in part, on location signals received from one or more transmitters 106. In certain example implementations, measurements 302 may include signal strength measurements 340, code phase measurements 342, relative signal strength measurements 344 (e.g. between signals received from different transmitters), relative code phase measurements 346 (e.g. between signals received from different transmitters), and/or other like measurements associated with one or more received location signals. Such measurements may be stored in memory.

Mobile device 102 may be adapted to determine or otherwise establish an estimated location 306 based, at least in part, on the received location signals and/or measurements 302. In certain example implementations, mobile device 102 may be adapted to perform trilateration or other like position determining processes. To estimate its location mobile device 102 may be adapted to access location information (not shown) associated with one or more transmitters 106. Such location information may be provided by network resource 118 and/or other devices. Various processes for determining an estimated location are well known.

Mobile device 102 may be adapted to determine or otherwise establish a dilution of precision (DOP) 308 associated with estimated location 306. Here, location 306 may represent location 104 (FIG. 1). Various processes for determining a dilution of precision are well known.

Mobile device 102 may be adapted to access at least one threshold DOP 304 and/or at least one threshold number of geographically distinctive transmitters ($N_{GDT}$) 305. Here, for example, threshold DOP 304 may identify or otherwise represent an acceptable and/or minimum DOP level for mobile device 102, system 300, mobile device positioning system 100, etc. Here, for example, threshold $N_{GDT}$ 305 may identify or otherwise represent an acceptable and/or minimum quality of positioning for mobile device 102, system 300, mobile device positioning system 100, etc.

Mobile device 102 may be adapted to dynamically establish at least one location signal transmission parameter 310 based, at least in part, on at least a portion of measurements 302. Here, for example, location signal transmission parameter 310 may be adapted for use by at least a second portion 112 of transmitters 106 to operatively initiate subsequent transmission of an additional plurality of location signals 122 that may be adapted to be received by mobile device 102.

In certain example implementations, location signal transmission parameter 310 may include at least one rate parameter 312. Rate parameter 312 may be adapted to identify in some manner at least one operational aspect associated with transmitting or not transmitting an additional location signal. By way of example but not limitation, rate parameter 312 may be adapted to identify if and/or how often one or more transmitters 106 should transmit one or more additional location signals 122. By way of example but not limitation rate parameter 312 may be adapted to identify if and/or how often one or more transmitters 106 should not transmit one or more additional location signals 122. By way of example but not limitation rate parameter 312 may include at least one transmission timing ratio 314 that may be adapted to identify an ON:OFF ratio or OFF:ON ratio specifying how often (e.g., a percentage of time, duty cycle, etc.) one or more transmitters 106 should transmit (ON) or not transmit (OFF) one or more additional location signals 122.

In certain example implementations, mobile device 102 may be adapted to establish location signal transmission parameter(s) 310 based, at least in part, on DOP 308 and/or at least one threshold DOP 304. For example, threshold DOP 304 may be associated with an acceptable or minimum number of transmitters 106 that may be included in second portion 112 and adapted to transmit one or more additional location signals 122. In certain example implementations, mobile device 102 may be adapted to establish location signal transmission parameter(s) 310 based, at least in part, a number of geographically distinctive transmitters ($N_{GDT}$) 309. $N_{GDT}$ 309 may, for example, be used to determine whether to increase or decrease a rate 312 or the like based on a threshold $N_{GDT}$ 305.

Thus, as described herein, one or more location signal transmission parameters 310 may be adapted to operatively increase or decrease a number of transmitters 106 adapted to transmit additional location signals 122 during a subsequent search period. Thus, for example, a location signal transmission operation 320 may be implemented in one or more transmitters 106 and adapted to respond to rate parameter 312 in some manner that changes operation of the one or more transmitters with regard to at least the transmission of additional location signals 122. Accordingly, in certain example implementations rate parameter 312 may be adapted to effectively establish a number of transmitters 106 in second portion 112.

As shown in FIG. 3, mobile device 102 may be adapted to provide one or more location signal transmission parameters 310 to network resource 118. Network resource 118 may be adapted to provide one or more location signal transmission parameters 310 to one or more transmitters 106.

As illustrated in FIG. 3, each transmitter 106-1, . . . , 106-n may be adapted to operate according to a location signal transmission operation 320. Location signal transmission operation 320 may initially be adapted to allow transmitter 106 to selectively transmit location signal(s) during a search period based, at least in part, on an initial location signal transmission parameter 322. Location signal transmission operation 320 may be adapted to allow transmitter 106 to selectively transmit additional location signal(s) during a subsequent search period based, at least in part, on location signal transmission parameter 310.

Figure 5:
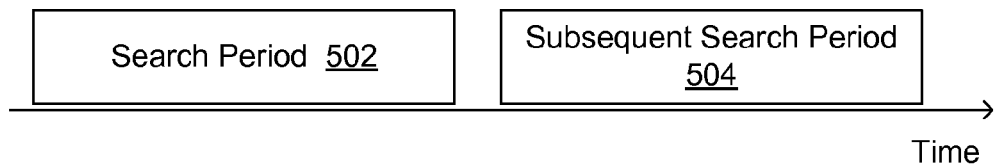
FIG. 5 is time line diagram illustrating exemplary search periods that may be implemented in certain mobile device positioning systems.

To further illustrate functions in system 300, attention is directed to FIG. 5, which illustrates an exemplary timeline 500 having a search period 502 followed at a later time by a subsequent search period 504. While there is a visible gap between the illustrated search periods 502 and 504, it should be understood that in certain implementations such search periods may be temporally adjacent. Further, while each search period 502 and 504 is illustrated as being temporally contiguous, in certain implementations one or more search periods may not be temporally contiguous.

Returning to FIG. 3, during search period 502 one or more transmitters 106 may selectively transmit location signal(s) 120 in accordance with operation 320 and initial parameter(s) 322, and mobile device 102 may receive, detect and measure one or more of location signal(s) 120. Prior to subsequent search period 504, mobile device 102 may dynamically establish parameter(s) 310, which may then be provided to network resource 118 and/or one or more transmitters 106. During subsequent search period 504 one or more transmitters 106 may selectively transmit additional location signal(s) 122 in accordance with operation 320 and parameter(s) 310. Mobile device 102 may then attempt to receive, detect and measure one or more of the additional location signal(s) 122. The basic functioning of system 300 as described in the example above may be repeated for a plurality of further subsequent search periods.

In certain example implementations, one or more parameter(s) 310 may be provided to all of the transmitters 106. In certain example implementations, one or more parameter(s) 310 may instead be selectively provided to certain transmitter(s) 106. Thus, for example, as shown in FIG. 3, transmitters 106-1 through 106-6, which are in second portion 112 (see FIG. 1), may be provided with parameter(s) 310, while transmitters 106-7 through 106-n may or may not. For example, network resource 118 may be adapted to selectively provide one or more parameters 310 to certain transmitter(s) 106.

In certain example implementations, one or more parameter(s) 310 may be specifically adapted for use by one or more specific transmitters 106. For example, mobile device 102 and/or network resource 118 may selectively adapt a parameter 310 for use by a specific transmitter 106.

Figure 4:
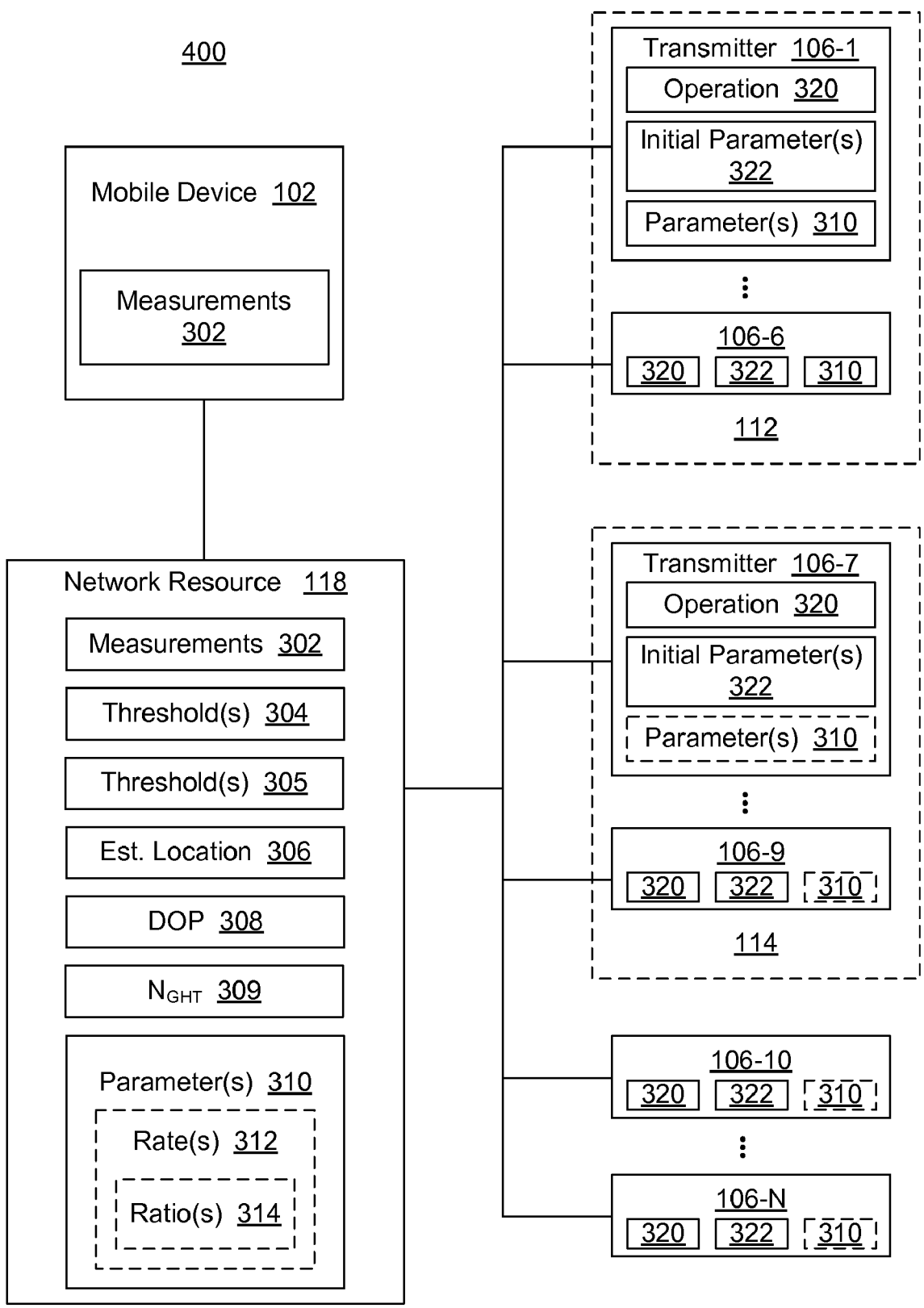
FIG. 4 is block diagram illustrating an exemplary mobile device positioning system having a network resource adapted to support certain mobile device positioning processes, in accordance with an implementation.

Reference is now made to FIG. 4, which is a block diagram illustrating a system 400 that may be an implementation of mobile device positioning system 100. System 400 is similar to system 300, in that it may include mobile device 102, which may be coupled to network resource 118. Network resource 118 may be coupled to transmitters 106-1, . . . , 106-n. System 400 is different from system 300, in that it may shift some of the exemplary processes from mobile device 102 to network resource 118.

For example, as illustrated in FIG. 4, mobile device 102 may be adapted to produce measurements 302 based, at least in part, on location signals received from one or more transmitters 106. In certain example implementations, measurements 302 may include signal strength measurements 340, code phase measurements 342, relative signal strength measurements 344, relative code phase measurements 346, and/or other like measurements associated with one or more received location signals. Such measurements may be stored in memory and/or provided to network resource 118.

Network resource 118 may be adapted to determine or otherwise establish an estimated location 306 (e.g., representing location 104) of mobile device 102 based, at least in part, on measurements 302. In certain example implementations, network resource 118 may be adapted to perform trilateration or other like position determining processes. To estimate the location of mobile device 102, network resource 118 may be adapted to access location information (not shown) associated with one or more transmitters 106. Network resource 118 may be adapted to determine or otherwise establish a dilution of precision (DOP) 308 associated with estimated location 306.

Network resource 118 may be adapted to access at least one threshold DOP 304, threshold $N_{GDT}$ 305, etc. Here, for example, threshold DOP 304 may identify or otherwise represent an acceptable and/or minimum DOP level for mobile device 102, system 300, mobile device positioning system 100, etc. Here, for example, threshold $N_{GDT}$ 305 may identify or otherwise represent an acceptable and/or minimum quality of positioning for mobile device 102, system 300, mobile device positioning system 100, etc.

Network resource 118 may be adapted to dynamically establish at least one location signal transmission parameter 310 based, at least in part, on at least a portion of measurements 302. Here, for example, location signal transmission parameter 310 may be adapted for use by at least a second portion 112 of transmitters 106 to operatively initiate subsequent transmission of an additional plurality of location signals 122. In certain example implementations, location signal transmission parameter 310 may include at least one rate parameter 312 and/or at least one transmission timing ratio 314.

In certain example implementations, network resource 118 may be adapted to establish location signal transmission parameter(s) 310 based, at least in part, on DOP 308 and/or at least one threshold DOP 304, and/or on $N_{GDT}$ 309 and/or at least one threshold $N_{GDT}$ 305.

As shown in FIG. 4, network resource 118 may be adapted to provide one or more location signal transmission parameters 310 to one or more transmitters 106.

Figure 6:
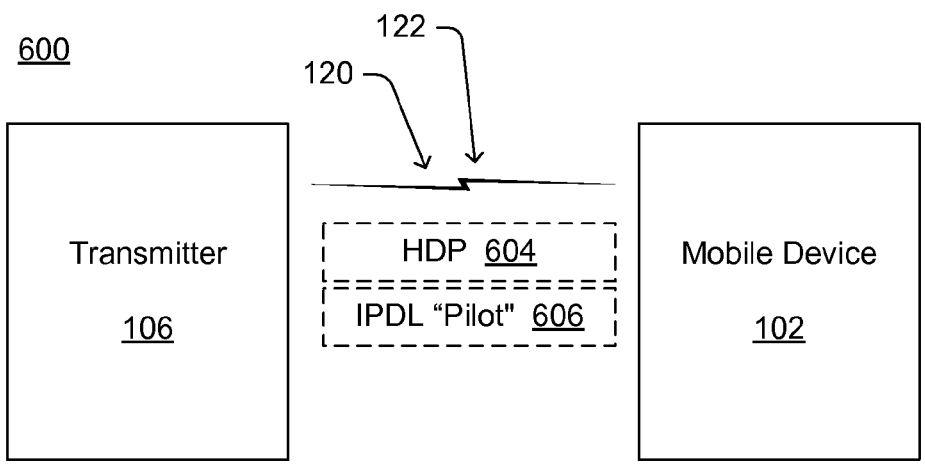
FIG. 6 is block diagram illustrating some exemplary location signals that may be implemented in certain mobile device positioning systems.

Attention is now directed to FIG. 6, which is a block diagram illustrating location signals 120 and/or additional location signals 122 transmitted from a transmitter 106 to a mobile device 102. Here, for example, a location signal 102 and/or additional location signal 122 may include at least one of a Highly Detectable Pilot (HDP) signal (604), and/or an Idle Period Down Link (IPDL) (606) "pilot signal" (i.e., a pilot signal implemented as part of an IPDL scheme).

Figure 7:
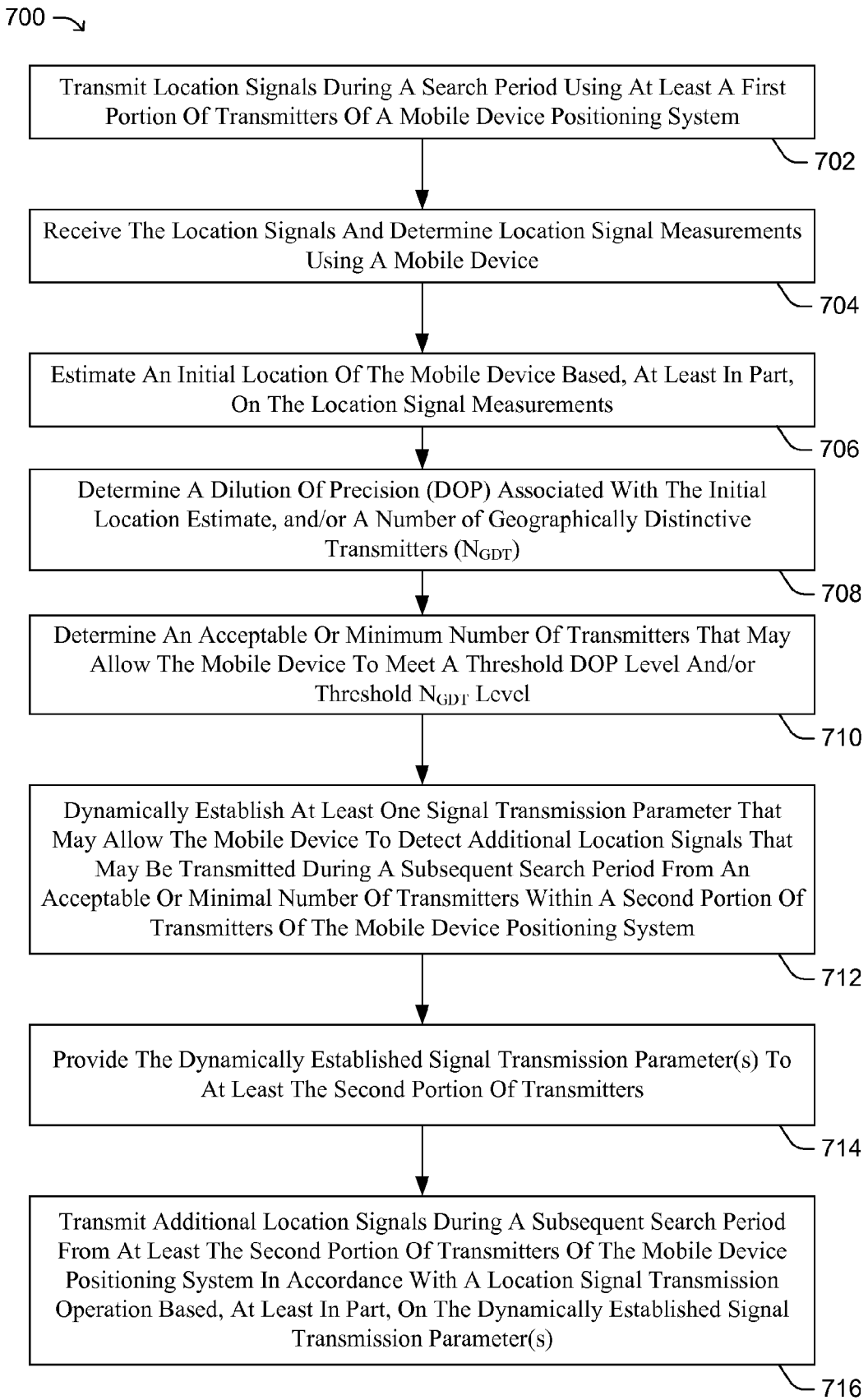
FIGS. 7-10 are flow-diagrams illustrating certain exemplary methods that may be implemented in certain mobile device positioning systems, for example, as in FIGS. 1, 3, and/or 4.

Attention is now directed to FIG. 7, which is a flow diagram illustrating an exemplary method 700 that may be implemented in systems 100, 300 and/or 400, for example.

At block 702, location signals may be transmitted during a search period using at least a first portion of transmitters of a mobile device positioning system. At block 704, at least one of the transmitted location signals may be received and detected by a mobile device and location signal measurements taken. At block 706, an estimate of an initial location of the mobile device may be established based, at least in part, on the location signal measurements. At block 708, a dilution of precision (DOP) associated with the initial location estimate, and/or a number of geographically distinctive transmitters ($N_{GDT}$) may be determined. At block 710, an acceptable or minimum number of transmitters that may allow the mobile device to meet a threshold DOP level and/or threshold $N_{GDT}$ level may be determined.

At block 712, at least one signal transmission parameter may be dynamically established. The signal transmission parameter may be adapted to allow the mobile device to receive and detect "additional" location signals (here, the term "additional" may include the same number, a greater number, or lesser number of subsequently transmitted location signals). Such additional location signals may be transmitted during a subsequent search period from an acceptable or minimal number of transmitters within a second portion of transmitters of the mobile device positioning system.

At block 714, the dynamically established signal transmission parameter(s) may be provided to at least the second portion of transmitters. At block 716, additional location signals may be transmitted during a subsequent search period from at least the second portion of transmitters in accordance with a location signal transmission operation based, at least in part, on the dynamically established signal transmission parameter(s).

It should be recognized that one or more of the blocks and/or flow of method 700 may iterated or otherwise repeated over time.

In accordance with certain aspects of the present description, some exemplary search strategy techniques will now be presented. These techniques may be implemented in mobile device positioning system 100.

In an exemplary search strategy technique, for example, one may define:

K as a ratio of a probability of a transmitter 106 transmitting a down link including the pilot channel (e.g., a location signal 120, 122) for positioning to the probability of the transmitter 106 to stop the down link transmission;

N as a number of total pilot channels detected; and

M as a number of measurements 302 per pilot channel.

As such, one may observe that an increase in a search period may increase K, which may lead to an increase in N and a reduction in M.

In certain situations, such as, e.g., macro-cell arrangements, it is believed that, to improve system performance, increasing N may be less effective than increasing M. Thus, it may be beneficial to establish a smaller K in certain situations such as, e.g., macro-cell arrangements, such that M may be increased and N may be decreased.

With this in mind, K may be dynamically established based, at least in part, on information from mobile device 102 and/or network resource 116 (e.g., a positioning server in the network (PDE), etc.) to achieve a target quality of positioning. For example, mobile device 102 and/or network resource 116 may be adapted to determine if there should be a greater or lesser number of location signals (120, 122) available to mobile device 102 to efficiently improve the position accuracy. Thus, mobile device 102 and/or network resource 116 may identify or otherwise specify a change in K. For example, in certain implementations, mobile device 102 and/or network resource 116 may communicate K to and/or request a change in K by a transmitter 106 (e.g., a service base station) or other like device. Here, for example, the adjusted K may be applied selectively to a second portion 112 of transmitters 106, such as, e.g., the service base station and/or other neighboring base stations.

Figure 8:
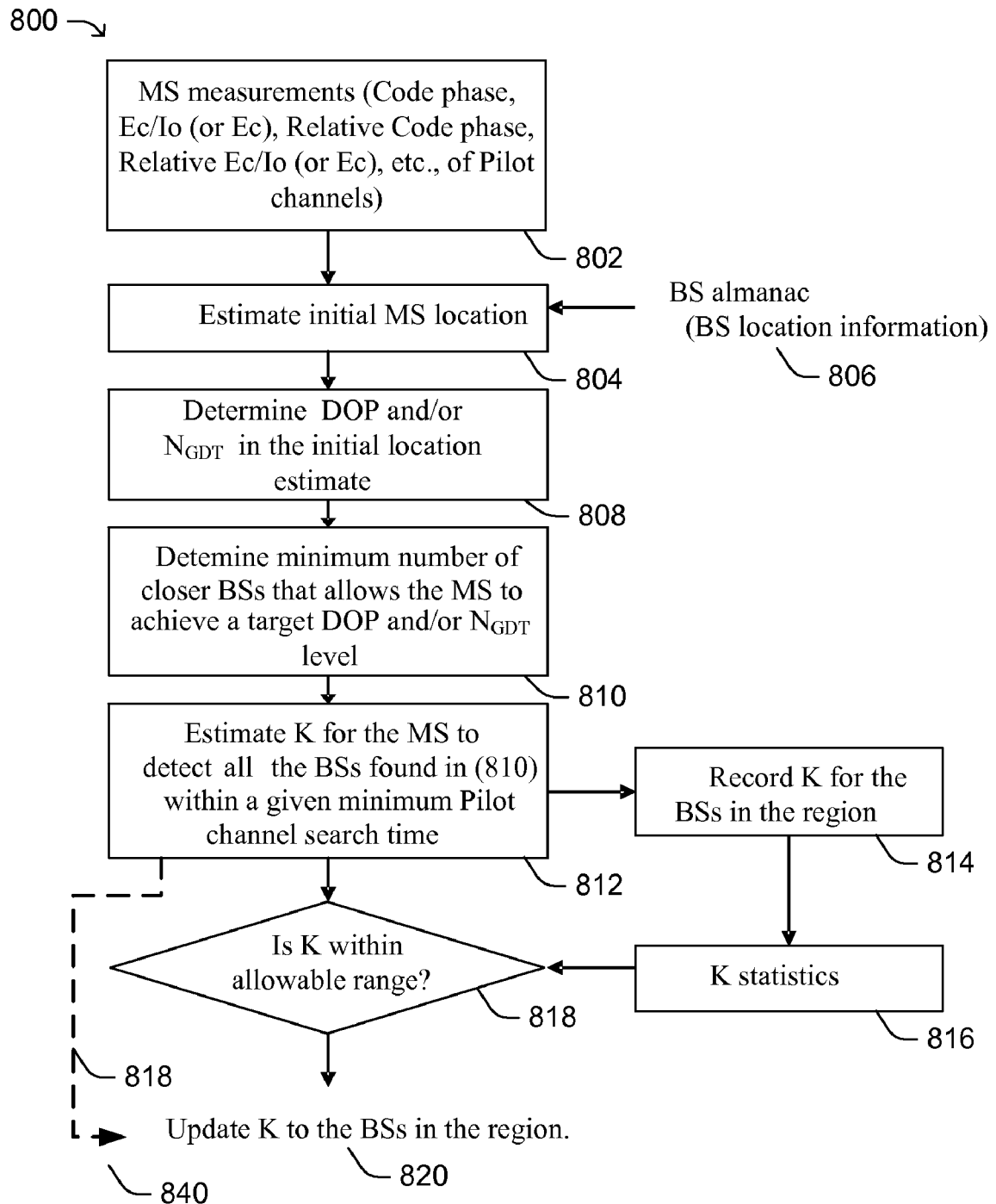

Attention is now drawn to FIG. 8, which is a flow diagram illustrating an exemplary method 800 that may be implemented to dynamically establish a rate or ratio (K) of HDP signal turn ON/OFF. Method 800 may be adapted to attempt to optimize K for HDP operations in a mobile device positioning system having a PDE (e.g., network resource 116 or the like). It is, however, recognized that method 800 may be adapted for other like systems.

In this example, mobile device 102 may include a mobile station (MS) and a transmitter 106 may include a base station (BS). At block 802, the MS may receive, detect and take measurements of pilot channels. At block 804, the PDE may receive or otherwise access measurements, such as, e.g., code phase measurements, signal strength measurements, relative signal strength measurements, relative code phase measurements, and/or the like, of the detected (forward link) pilot channels. With the measurements, the PDE may estimate the initial MS location, for example, using the measurements and a BS almanac 806 or other like BS location information. At block 808, the PDE may determine the DOP and/or the $N_{GDT}$ of the BS's based, at least in part, on the initial location estimate.

At block 810, the system may determine if some of the associated BS's, such as, e.g., BS's that may be located relatively further away from the MS may be eliminated from subsequent transmissions. Thus, for example, at block 810 it may be determined that some BS's may not be dominant for the DOP and/or $N_{GDT}$ as long as the target DOP and/or target $N_{GDT}$ level associated with the remaining BS's falls within an allowable level, for example, as specified in a threshold DOP and/or threshold $N_{GDT}$. At block 810, it may also be determined if the target DOP satisfies the threshold DOP (DOPth), a threshold $N_{GDT}$, and/or that the number of BS's in the MS's measurement satisfied a minimum required number of BS's threshold (Nmin). Theoretically, the Nmin is three for two-dimensional positioning. However, if the initial estimated DOP is worse than the DOPth, threshold $N_{GDT}$, and/or the number of BS's in the MS's measurement is lower than Nmin, then the system may attempt to add more BS's to those already included in the MS's measurement to try to satisfy the DOPth and/or threshold $N_{GDT}$.

At block 812, the system may determine or otherwise estimate a minimum K (Kmin). Kmin may be associated with the MS and/or for the BS's in the region (e.g., second portion 112, a service BS and neighbor BS's, etc.) such that the MS may detect the BS's identified at block 810 with an acceptable probability (e.g., high probability (>0.9)) within a subsequent search period. The Kmin at block 812 may be stored in a K-DB (data base of K values, or other like resource) at block 814.

At block 816, the Kmin may be compared with statistics associated with K for the region that the MS currently belongs. At block 818, the system may determine, for example, based on the K statistics, a final K such that, for example:

If Kmin is within an allowable range of the statistics of K (for example, within one sigma), the system may select Kmin for the MS and/or for the BS's in the region;

If Kmin is smaller than the minimum K in an allowable K range (K_allowed_min≦K≦K_allowed_max), the system may select the K_allowed_min; or If Kmin is larger than K_allowed_max, the system may select Kmin.

At 820, the system may provide the selected K to one or more devices/resources as needed.

Figure 9:
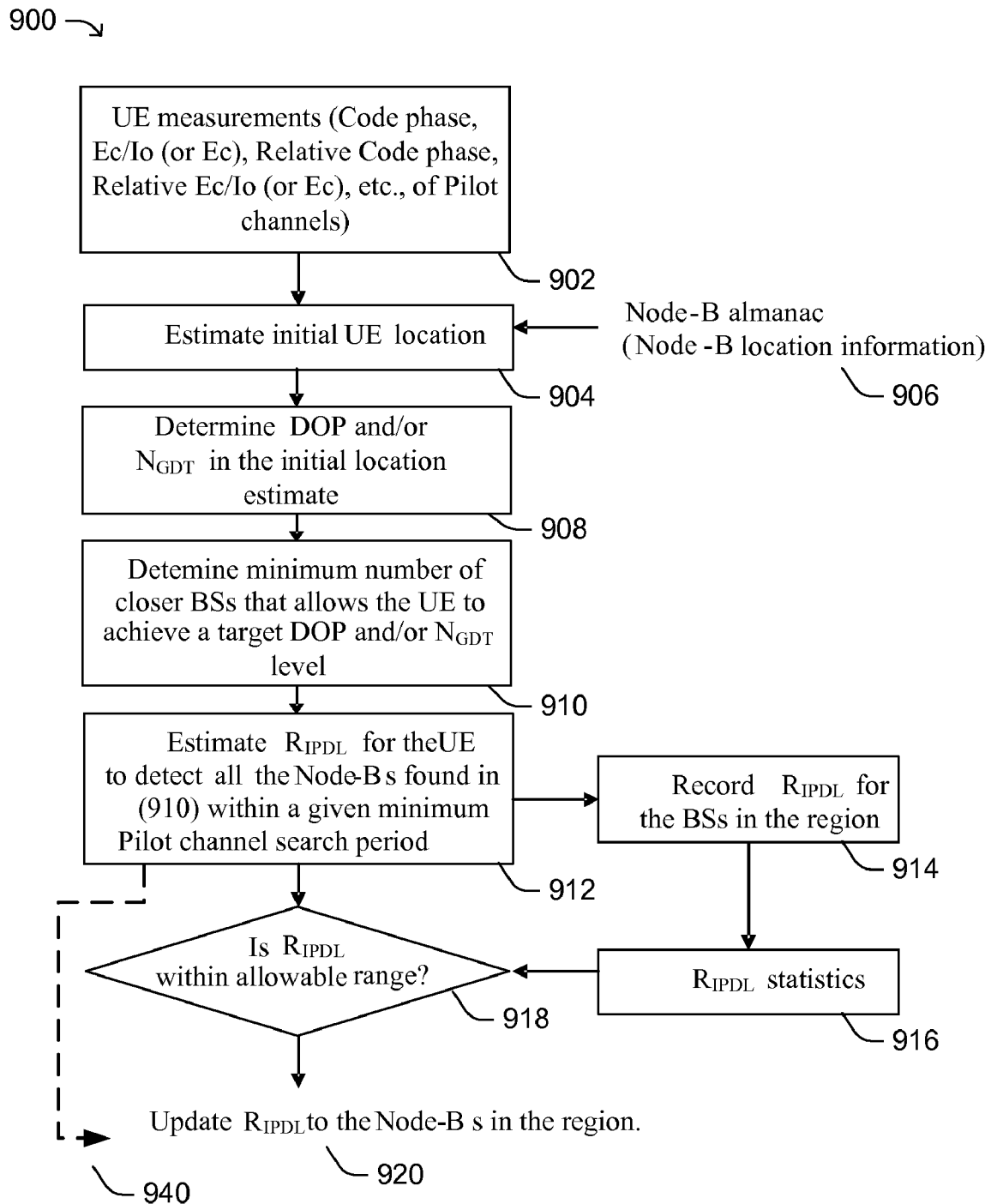

Attention is now drawn to FIG. 9, which is a flow diagram illustrating an exemplary method 900 that may be implemented to dynamically establish a rate ($R_{IPDL}$) in an IPDL system. Method 900 may be adapted to attempt to optimize $R_{IPDL}$ for IPDL operations in a mobile device positioning system having a PDE (e.g., network resource 116 or the like), however it is also recognized that method 900 may be adapted for other like systems.

In this example, mobile device 102 may include user equipment (UE) and a transmitter 106 may include a Node-B. At block 902, the UE may receive, detect and take measurements of pilot channels. At block 904, the PDE may receive or otherwise access measurements, such as, e.g., code phase measurements and/or signal strength measurements of the detected (forward link) pilot channels. With the measurements, the PDE may estimate the initial UE location, for example, using, using the measurements and Node-B synchronization error measurements 906. Such Node-B synchronization error measurements may be provided by a network resource such as, e.g., a location measurement unit (LMU) or the like. At block 908, the PDE may determine the DOP and/or $N_{GDT}$ of the Node-B's based, at least in part, on the initial location estimate.

At block 910, the system may determine if some of the associated Node-B's that may be located relatively further away from the UE may be eliminated from subsequent transmissions. Thus, for example, at block 910 it may be determined that some Node-B's may not be dominant for the DOP and/or $N_{GDT}$ as long as the target DOP level and/or target $N_{GDT}$ level associated with the remaining Node-B's falls within an allowable level, for example, as specified in a threshold DOP and/or threshold $N_{GDT}$.

At block 912, the system may determine or otherwise estimate a minimum $R_{IPDL}$ ($R_{IPDL}$min). $R_{IPDL}$min may be associated with the UE and/or for the Node-B's in the region (e.g., second portion 112, a service Node-B and neighbor Node-B's, etc.) such that the UE may detect the Node-B's identified at block 910 with an acceptable probability (e.g., high probability (>0.9)) within a subsequent search period. The $R_{IPDL}$min at block 912 may be stored in a $R_{IPDL}$-DB (data base of $R_{IPDL}$ values, or other like resource) at block 914.

At block 916, the $R_{IPDL}$min may be compared with statistics associated with $R_{IPDL}$ for the region that the UE currently belongs. At block 918, the system may determine, for example, based on the $R_{IPDL}$ statistics, a final $R_{IPDL}$ such that, for example:

If $R_{IPDL}$min is within an allowable range of the statistics of $R_{IPDL}$ (for example, within one sigma), the system may select $R_{IPDL}$min for the UE and/or for the Node-B's in the region;

If $R_{IPDL}$min is smaller than the minimum $R_{IPDL}$ in an allowable $R_{IPDL}$ range ($R_{IPDL}$_allowed_min$\leq R_{IPDL} \leq R_{IPDL}$_allowed_max), the system may select the $R_{IPDL}$_allowed_min; or If $R_{IPDL}$min is larger than $R_{IPDL}$_allowed_max, may select the $R_{IPDL}$min.

At 920, the system may provide the selected $R_{IPDL}$ to one or more devices/resources as needed.

Exemplary methods 800 and 900 may be adapted for use in providing dedicated positioning support for a mobile device. As mentioned above, in certain situations it may be beneficial to increase the number of measurements per each transmitter since doing so may improve position accuracy. Thus, for example, if a mobile device needs dedicated positioning support, e.g., as may be the case with E911 services, the system may be adapted to at least attempt to optimize a signal transmission parameter (e.g., K, $R_{IPDL}$, etc.) dynamically.

With this in mind, methods 800 and 900 may be adapted for dedicated positioning support as illustrated by lines 840 and 940, respectively. For example, method 800, may be adapted for dedicated positioning support by skipping blocks 814, 816, and 818, and instead adjusting K per block 812 at 820. Similarly, for example, method 900, may be adapted for dedicated positioning support by skipping blocks 914, 916, and 918, and instead adjusting $R_{IPDL}$ per block 912 at 920.

Figure 10:
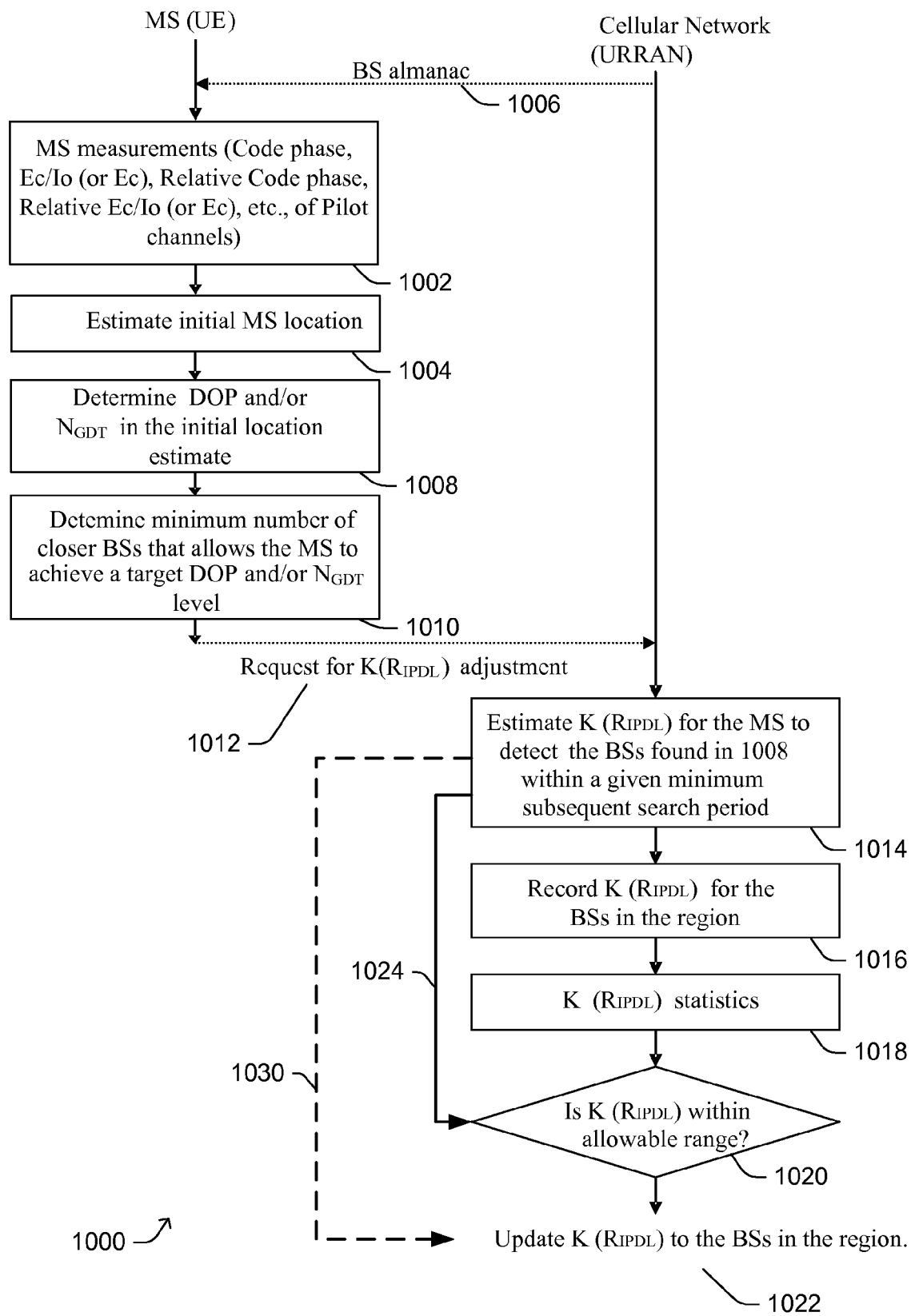

Attention is now drawn to FIG. 10, which is a flow diagram illustrating an exemplary method 1000 that may be implemented to dynamically establish a rate (e.g., K, $R_{IPDL}$). Method 1000 may be adapted to attempt to optimize K and/or $R_{IPDL}$ as applicable for HDP and/or IPDL operations in a mobile device positioning system having a PDE (e.g., network resource 116 or the like). It is, however, also recognized that method 1000 may be adapted for other like systems. In this example, mobile device 102 may include an MS and/or UE and a transmitter 106 may include a BS and/or Node-B, as applicable.

Method 1000 is similar to methods 800 and 900. Thus, for example, blocks 802, 902 and 1002 may be substantially functionally equivalent, blocks 804, 904 and 1004 may be substantially functionally equivalent, blocks 808, 908 and 1008 may be substantially functionally equivalent, and/or blocks 810, 910 and 1010 may be substantially functionally equivalent.

Thus, for example, the MS (UE) may measure forward (down) link BS (Node-B) pilot channels perform per blocks 1002, 1004, 1008, and 1010. If the MS (UE) determines that K (or $R_{IPDL}$) is too small or too large to achieve a target DOP level, then the MS (UE) may send a request 1012 for K (or $R_{IPDL}$) adjustment to the position location control function, which may be implemented, for example, in cellular network (or UTRAN) or other like network resource. Here, for example, a PDE system may be adapted an example of such position location function in the cellular network (or in the UTRAN for UMTS, or the like). In request 1012, the MS (UE) may send (1) the DOP and/or $N_{GDT}$ from block 1008, and a list of detected pilot channels (or BS (Node-B) identities, measurements, etc.) that may be used for positioning; and/or (2) a proposed or requested value and/or adjustment of K (or $R_{IPDL}$).

Method 1000 is further similar to methods 800 and 900 in that, for example, blocks 812, 912 and 1014 may be substantially functionally equivalent, blocks 814, 914 and 1016 may be substantially functionally equivalent, blocks 816, 916 and 1018 may be substantially functionally equivalent, and/or blocks 818, 918 and 1020 may be substantially functionally equivalent.

Thus, for example, in response to request 1012, the PDE may be adapted to update K (or $R_{IPDL}$) at 1022 by: (1) estimating an optimal K (or $R_{IPDL}$) per blocks 1014, 1016, 1018, and 1020; (2) considering the proposed or requested value and/or adjustment of K (or $R_{IPDL}$) as illustrated by line 1024 to block 120 directly; (3) or updating according to the proposed or requested value and/or adjustment of K (or $R_{IPDL}$) as illustrated by line 1030 (e.g., for dedicated positioning support, E911, etc.).

While certain exemplary techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all implementations falling within the scope of the appended claims, and equivalents thereof.

What is claimed is:

1. A method for use in a mobile device positioning system, the method comprising:
accessing a plurality of measurements associated with a plurality of location signals as received by a mobile device from at least a first portion of a plurality of transmitters; and
dynamically establishing at least one location signal transmission parameter based, at least in part, on said plurality of measurements, said at least one location signal transmission parameter configured to facilitate at least a second portion of said plurality of transmitters to operatively initiate subsequent transmission of an additional plurality of location signals configured to be received by said mobile device.

2. The method as recited in claim 1, wherein said location signal transmission parameter is configured to operatively establish said second portion of said plurality of transmitters.

3. The method as recited in claim 1, wherein said plurality of location signals are received by said mobile device during a search period, and said location signal transmission parameter is configured to operatively adapt at least said second portion of said plurality of transmitters to transmit said additional plurality of location signals during a subsequent search period.

4. The method as recited in claim 1, wherein said location signal transmission parameter is configured to operatively increase or decrease a number of transmitters that transmit said additional plurality of location signals during a subsequent search period.

5. The method as recited in claim 1, wherein said first portion of said plurality of transmitters comprises at least a first transmitter located at a first distance from said mobile device and wherein said second portion of said plurality of transmitters comprises at least a second transmitter located at a second distance from said mobile device, and wherein said first and second distances are different.

6. The method as recited in claim 1, wherein at least one of said plurality of location signals as received by said mobile device from at least one transmitter in said first portion of said plurality of transmitters is selectively transmitted there from based, at least in part, on an initial location signal transmission parameter.

7. The method as recited in claim 1, wherein said at least one location signal transmission parameter comprises a rate parameter, said rate parameter configured to facilitate a location signal transmission operation associated with at least said second portion of said plurality of transmitters to operatively initiate transmission of said additional plurality of location signals.

8. The method as recited in claim 7, wherein a change of said rate parameter associated with said location signal transmission operation correspondingly operatively changes a number of transmitters in said second portion.

9. The method as recited in claim 7, wherein said rate parameter identifies a transmission timing ratio.

10. The method as recited in claim 1, further comprising, during a subsequent search period, selectively transmitting two or more of said additional plurality of location signals from at least one transmitter in said second portion based, at least in part, on said at least one location signal transmission parameter.

11. The method as recited in claim 1, further comprising determining said plurality of measurements with said mobile device.

12. The method as recited in claim 1, wherein said plurality of measurements comprise at least one of a signal strength measurement, a code phase measurement, a relative signal strength measurement, and/or a relative code phase measurement.

13. The method as recited in claim 1, further comprising transmitting said plurality of measurements from said mobile device to at least one network resource.

14. A method for use in a mobile device positioning system, the method comprising:
accessing a plurality of measurements associated with a plurality of location signals as received by a mobile device from at least a first portion of a plurality of transmitters; and
dynamically establishing at least one location signal transmission parameter based, at least in part, on said plurality of measurements, said at least one location signal transmission parameter configured to facilitate at least a second portion of said plurality of transmitters to operatively initiate subsequent transmission of an additional plurality of location signals configured to be received by said mobile device, wherein at least one of said additional plurality of location signals comprises a Highly Detectable Pilot (HDP) signal and/or an Idle Period Down Link (IPDL) pilot signal.

15. The method as recited in claim 1, A method for use in a mobile device positioning system, the method comprising:
accessing a plurality of measurements associated with a plurality of location signals as received by a mobile device from at least a first portion of a plurality of transmitters; and
dynamically establishing at least one location signal transmission parameter based, at least in part, on said plurality of measurements, said at least one location signal transmission parameter configured to facilitate at least a second portion of said plurality of transmitters to operatively initiate subsequent transmission of an additional plurality of location signals configured to be received by said mobile device, wherein dynamically establishing said at least one location signal transmission parameter comprises:
estimating a location of said mobile device based, at least in part, on said plurality of measurements;
determining a dilution of precision (DOP) and/or a number of geographically distinctive transmitters ($N_{GDT}$) associated with said estimated location and said first portion of said plurality of transmitters; and
determining a rate parameter associated with a location signal transmission operation based, at least in part, on said DOP and/or said $N_{GDT}$.

16. The method as recited in claim 15, wherein determining said rate parameter comprises determining said rate parameter based, at least in part, on said DOP and a threshold DOP, and/or said $N_{GDT}$ and a threshold $N_{GDT}$.

17. The method as recited in claim 16, wherein threshold DOP is associated with an acceptable or minimum number of transmitters to be included within said second portion.

18. An apparatus for use in a mobile device positioning system, the apparatus comprising:

memory configured to store a plurality of measurements associated with a plurality of location signals as received by a mobile device from at least a first portion of a plurality of transmitters; and at least one processing unit coupled to said memory and configured to dynamically establish at least one location signal transmission parameter based, at least in part, on said plurality of measurements, said at least one location signal transmission parameter configured to facilitate at least a second portion of said plurality of transmitters to operatively initiate subsequent transmission of an additional plurality of location signals configured to be received by said mobile device.

19. The apparatus as recited in claim 18, further comprising a network interface coupled to at least one of said at least one processing unit and/or said memory and configured to receive said plurality of measurements over a network.

20. The apparatus as recited in claim 18, further comprising a network interface coupled to at least one of said at least one processing unit and/or said memory and configured to at least transmit said at least one location signal transmission parameter over a network to at least one transmitter in said second portion.

21. The apparatus as recited in claim 18, wherein said at least one location signal transmission parameter is configured to operatively establish said second portion of said plurality of transmitters.

22. The apparatus as recited in claim 18, wherein said plurality of location signals are received by said mobile device during a search period, and wherein said location signal transmission parameter is configured to operatively adapt at least said second portion of said plurality of transmitters to transmit said additional plurality of location signals during a subsequent search period.

23. The apparatus as recited in claim 18, wherein said location signal transmission parameter is configured to increase or decrease a number of transmitters that transmit said additional plurality of location signals during a subsequent search period.

24. The apparatus as recited in claim 18, wherein said first portion of said plurality of transmitters comprises at least a first transmitter located at a first distance from said mobile device and wherein said second portion of said plurality of transmitters comprises at least a second transmitter located at a second distance from said mobile device, and wherein said first and second distances are different.

25. The apparatus as recited in claim 18, wherein said at least one location signal transmission parameter comprises a rate parameter, said rate parameter configured to facilitate a location signal transmission operation associated with at least said second portion of said plurality of transmitters to operatively initiate transmission of said additional plurality of location signals.

26. An apparatus for use in a mobile device positioning system, the apparatus comprising:

memory configured to store a plurality of measurements associated with a plurality of location signals as received by a mobile device from at least a first portion of a plurality of transmitters; and at least one processing unit coupled to said memory and configured to dynamically establish at least one location signal transmission parameter based, at least in part, on said plurality of measurements, said at least one location signal transmission parameter configured to facilitate at least a second portion of said plurality of transmitters to operatively initiate subsequent transmission of an additional plurality of location signals configured to be received by said mobile device, wherein said at least one location signal transmission parameter comprises a rate parameter, said rate parameter configured to facilitate a location signal transmission operation associated with at least said second portion of said plurality of transmitters to operatively initiate transmission of said additional plurality of location signals, and wherein said rate parameter is configured to initiate at least one transmitter in said second portion of said plurality of transmitters to transmit at least one of said additional plurality of location signals, said at least one of said additional plurality of location signals comprising a Highly Detectable Pilot (HDP) signal and/or an Idle Period Down Link (IPDL) pilot signal.

27. An apparatus for use in a mobile device positioning system, the apparatus comprising:

memory configured to store a plurality of measurements associated with a plurality of location signals as received by a mobile device from at least a first portion of a plurality of transmitters; and at least one processing unit coupled to said memory and configured to dynamically establish at least one location signal transmission parameter based, at least in part, on said plurality of measurements, said at least one location signal transmission parameter configured to facilitate at least a second portion of said plurality of transmitters to operatively initiate subsequent transmission of an additional plurality of location signals configured to be received by said mobile device, wherein said at least one processing unit is further configured to:

estimate a location of said mobile device based, at least in part, on said plurality of measurements;

determine a dilution of precision (DOP) and/or a number of geographically distinctive transmitters ($N_{GDT}$) associated with said estimated location and said first portion of said plurality of transmitters; and establish a rate parameter associated with a location signal transmission operation based, at least in part, on said DOP and/or said $N_{GDT}$.

28. The apparatus as recited in claim 27, wherein establishing said rate parameter comprises establishing said rate parameter based, at least in part, on said DOP and a threshold DOP, and/or said $N_{GDT}$ and a threshold $N_{GDT}$, said threshold DOP and/or said threshold $N_{GDT}$ being associated with an acceptable or minimum number of transmitters to be included within said second portion.

29. An apparatus for a mobile device for use in a mobile device positioning system, the apparatus comprising:

memory;

a wireless communication interface coupled to said memory and configured to receive a plurality of location signals from at least a first portion of a plurality of transmitters and provide a plurality of measurements to said memory, said plurality of measurements being based, at least in part, on said plurality of location signals; and at least one processing unit coupled to said memory and configured to dynamically establish at least one location signal transmission parameter based, at least in part, on said plurality of measurements, said at least one location signal transmission parameter configured to facilitate at least a second portion of said plurality of transmitters to operatively initiate subsequent transmission of an additional plurality of location signals configured to be received by said mobile device, and wherein said wireless communication interface is further configured to transmit said at least one location signal transmission parameter over a wireless communication link.

30. The apparatus as recited in claim 29, wherein said at least one location signal transmission parameter is configured to operatively establish said second portion of said plurality of transmitters.

31. The apparatus as recited in claim 29, wherein said plurality of location signals are received by said wireless communication interface during a search period, and said location signal transmission parameter is configured to operatively adapt at least said second portion of said plurality of transmitters to transmit said additional plurality of location signals during a subsequent search period.

32. The apparatus as recited in claim 29, wherein said location signal transmission parameter is configured to increase or decrease a number of transmitters that transmit said additional plurality of location signals during a subsequent search period.

33. The apparatus as recited in claim 29, wherein said first portion of said plurality of transmitters comprises at least a first transmitter located at a first distance from said mobile device and wherein said second portion of said plurality of transmitters comprises at least a second transmitter located at a second distance from said mobile device, and wherein said first and second distances are different.

34. The apparatus as recited in claim 29, wherein said at least one location signal transmission parameter comprises a rate parameter, said rate parameter configured to facilitate a location signal transmission operation associated with at least said second portion of said plurality of transmitters to operatively initiate transmission of said additional plurality of location signals.

35. An apparatus for a mobile device for use in a mobile device positioning system, the apparatus comprising:
  memory;
  a wireless communication interface coupled to said memory and configured to receive a plurality of location signals from at least a first portion of a plurality of transmitters and provide a plurality of measurements to said memory, said plurality of measurements being based, at least in part, on said plurality of location signals; and
  at least one processing unit coupled to said memory and configured to dynamically establish at least one location signal transmission parameter based, at least in part, on said plurality of measurements, said at least one location signal transmission parameter configured to facilitate at least a second portion of said plurality of transmitters to operatively initiate subsequent transmission of an additional plurality of location signals configured to be received by said mobile device,
  wherein at least one of said additional plurality of location signals comprises a Highly Detectable Pilot (HDP) signal and/or an Idle Period Down Link (IPDL) pilot signal, and
  wherein said wireless communication interface is further configured to transmit said at least one location signal transmission parameter over a wireless communication link.

36. An apparatus for a mobile device for use in a mobile device positioning system, the apparatus comprising:
  memory;
  a wireless communication interface coupled to said memory and configured to receive a plurality of location signals from at least a first portion of a plurality of transmitters and provide a plurality of measurements to said memory, said plurality of measurements being based, at least in part, on said plurality of location signals; and
  at least one processing unit coupled to said memory and configured to dynamically establish at least one location signal transmission parameter based, at least in part, on said plurality of measurements, said at least one location signal transmission parameter configured to facilitate at least a second portion of said plurality of transmitters to operatively initiate subsequent transmission of an additional plurality of location signals configured to be received by said mobile device,
  wherein said wireless communication interface is further configured to transmit said at least one location signal transmission parameter over a wireless communication link, and
  wherein said at least one processing unit is further configured to:
    estimate a location of the mobile device based, at least in part, on said plurality of measurements;
    determine a dilution of precision (DOP) and/or a number of geographically distinctive transmitters ($N_{GDT}$) associated with said estimated location and said first portion of said plurality of transmitters; and
    establish a rate parameter associated with a location signal transmission operation based, at least in part, on said DOP and/or said $N_{GDT}$.

37. The apparatus as recited in claim 36, wherein establishing said rate parameter comprises establishing said rate parameter based, at least in part, on said DOP and a threshold DOP, and/or said $N_{GDT}$ and a threshold $N_{GDT}$, said threshold DOP and/or said threshold $N_{GDT}$ being associated with an acceptable or minimum number of transmitters to be included within said second portion.

38. A system comprising:
  a network;
  a plurality of transmitters coupled to said network;
  at least one network resource coupled to said network; and
  at least one mobile device configured to receive a plurality of location signals from at least a first portion of said plurality of transmitters, determine a plurality of measurements associated with said plurality of location signals, and provide said plurality of measurements to at least one of said transmitters, and
  wherein said at least one of said transmitters provides said plurality of measurements to said at least one network resource, said at least one network resource configured to dynamically establish at least one location signal transmission parameter based, at least in part, on said plurality of measurements, said at least one location signal transmission parameter configured to facilitate at least a second portion of said plurality of transmitters to operatively initiate subsequent transmission of an additional plurality of location signals configured to be received by said mobile device, and
  wherein said at least one network resource is configured to provide said at least one location signal transmission parameter to at least said second portion of said plurality of transmitters over said network.

39. The system as recited in claim 38, wherein said plurality of location signals are received by said mobile device during a search period, and wherein said location signal transmission parameter is configured to operatively adapt at least said second portion of said plurality of transmitters to transmit said additional plurality of location signals during a subsequent search period.

40. The system as recited in claim 38, wherein said at least one location signal transmission parameter comprises a rate parameter, said rate parameter configured to facilitate a location signal transmission operation associated with at least said second portion of said plurality of transmitters to operatively initiate transmission of said additional plurality of location signals.

41. A system comprising:
a network;
a plurality of transmitters coupled to said network;
at least one network resource coupled to said network; and
at least one mobile device configured to receive a plurality of location signals from at least a first portion of said plurality of transmitters, determine a plurality of measurements associated with said plurality of location signals, and provide said plurality of measurements to at least one of said transmitters, and
wherein said at least one of said transmitters provides said plurality of measurements to said at least one network resource, said at least one network resource configured to dynamically establish at least one location signal transmission parameter based, at least in part, on said plurality of measurements, said at least one location signal transmission parameter configured to facilitate at least a second portion of said plurality of transmitters to operatively initiate subsequent transmission of an additional plurality of location signals configured to be received by said mobile device,
wherein at least one of said additional plurality of location signals comprises a Highly Detectable Pilot (HDP) signal and/or an Idle Period Down Link (IPDL) pilot signal, and
wherein said at least one network resource is configured to provide said at least one location signal transmission parameter to at least said second portion of said plurality of transmitters over said network.

42. A system comprising:
a network;
a plurality of transmitters coupled to said network; and
at least one mobile device configured to receive a plurality of location signals from at least a first portion of said plurality of transmitters, determine a plurality of measurements associated with said plurality of location signals, dynamically establish at least one location signal transmission parameter based, at least in part, on said plurality of measurements, said at least one location signal transmission parameter configured to facilitate at least a second portion of said plurality of transmitters to operatively initiate subsequent transmission of an additional plurality of location signals configured to be received by said mobile device.

43. The system as recited in claim 42, further comprising:
at least one network resource coupled to said network, and
wherein said mobile device is configured to provide said plurality of measurements to at least one of said transmitters, and said at least one of said transmitters provides said plurality of measurements to said at least one network resource, said at least one network resource being configured to provide said at least one location signal transmission parameter to at least said second portion of said plurality of transmitters over said network.

44. The system as recited in claim 42, wherein said plurality of location signals are received by said mobile device during a search period, and wherein said location signal transmission parameter is configured to operatively adapt at least said second portion of said plurality of transmitters to transmit said additional plurality of location signals during a subsequent search period.

45. The system as recited in claim 42, wherein said at least one location signal transmission parameter comprises a rate parameter, said rate parameter configured to facilitate a location signal transmission operation associated with at least said second portion of said plurality of transmitters to operatively initiate transmission of said additional plurality of location signals.

46. A system comprising:
a network;
a plurality of transmitters coupled to said network; and
at least one mobile device configured to receive a plurality of location signals from at least a first portion of said plurality of transmitters, determine a plurality of measurements associated with said plurality of location signals, dynamically establish at least one location signal transmission parameter based, at least in part, on said plurality of measurements, said at least one location signal transmission parameter configured to facilitate at least a second portion of said plurality of transmitters to operatively initiate subsequent transmission of an additional plurality of location signals configured to be received by said mobile device,
wherein at least one of said additional plurality of location signals comprises a Highly Detectable Pilot (HDP) signal and/or an Idle Period Down Link (IPDL) pilot signal.

47. A non-transitory computer readable medium comprising computer implementable instructions stored thereon, which if implemented adapts one or more processing units to:
access a plurality of measurements associated with a plurality of location signals as received by a mobile device from at least a first portion of a plurality of transmitters; and
dynamically establish at least one location signal transmission parameter based, at least in part, on said plurality of measurements, said at least one location signal transmission parameter configured to facilitate at least a second portion of said plurality of transmitters to operatively initiate subsequent transmission of an additional plurality of location signals configured to be received by said mobile device.

48. The non-transitory computer readable medium as recited in claim 47, wherein said location signal transmission parameter operatively establishes said second portion of said plurality of transmitters.

49. The non-transitory computer readable medium as recited in claim 47, wherein said plurality of location signals as received by said mobile device during a search period, and said location signal transmission parameter is configured to operatively adapt at least said second portion of said plurality of transmitters to transmit said additional plurality of location signals during a subsequent search period.

50. The non-transitory computer readable medium comprising computer implementable instructions stored thereon, which if implemented adapts one or more processing units to:
access a plurality of measurements associated with a plurality of location signals as received by a mobile device from at least a first portion of a plurality of transmitters; and
dynamically establish at least one location signal transmission parameter based, at least in part, on said plurality of measurements, said at least one location signal transmission parameter configured to facilitate at least a second portion of said plurality of transmitters to operatively initiate subsequent transmission of an additional plurality of location signals configured to be received by said mobile device,
wherein said at least one location signal transmission parameter comprises a rate parameter, said rate parameter configured to facilitate a location signal transmission operation associated with at least said second portion of said plurality of transmitters to operatively initiate transmission of said additional plurality of location signals, and wherein at least one of said additional plurality of location signals comprises a Highly Detectable Pilot (HDP) signal and/or an Idle Period Down Link (IPDL) pilot signal.

51. The non-transitory computer readable medium comprising computer implementable instructions stored thereon, which if implemented adapt said one or more processing units to:
access a plurality of measurements associated with a plurality of location signals as received by a mobile device from at least a first portion of a plurality of transmitters; and
dynamically establish at least one location signal transmission parameter based, at least in part, on said plurality of measurements, said at least one location signal transmission parameter configured to facilitate at least a second portion of said plurality of transmitters to operatively initiate subsequent transmission of an additional plurality of location signals configured to be received by said mobile device,
estimate a location of said mobile device based, at least in part, on said plurality of measurements;
determine a dilution of precision (DOP) and/or a number of geographically distinctive transmitters ($N_{GDT}$) associated with said estimated location and said first portion of said plurality of transmitters; and
determine a rate parameter associated with a location signal transmission operation based, at least in part, on said DOP and a threshold DOP, and/or said $N_{GDT}$ and a threshold $N_{GDT}$, said threshold DOP and/or said threshold $N_{GDT}$ being associated with an acceptable or minimum number of transmitters to be included within said second portion.

52. An apparatus for use in a mobile device positioning system, the apparatus comprising:
means for storing a plurality of measurements associated with a plurality of location signals as received by a mobile device from at least a first portion of a plurality of transmitters; and
means for dynamically establishing at least one location signal transmission parameter based, at least in part, on said plurality of measurements, said at least one location signal transmission parameter configured to facilitate at least a second portion of said plurality of transmitters to operatively initiate subsequent transmission of an additional plurality of location signals configured to be received by said mobile device.

53. The apparatus as recited in claim 52, wherein said at least one location signal transmission parameter is configured to operatively establish said second portion of said plurality of transmitters.

54. The apparatus as recited in claim 52, wherein said plurality of location signals are received by said mobile device during a search period, and wherein said location signal transmission parameter is configured to operatively adapt at least said second portion of said plurality of transmitters to transmit said additional plurality of location signals during a subsequent search period.

55. The apparatus as recited in claim 52, wherein said location signal transmission parameter is configured to increase or decrease a number of transmitters that transmit said additional plurality of location signals during a subsequent search period.

56. The apparatus as recited in claim 52, wherein said at least one location signal transmission parameter comprises a rate parameter, said rate parameter configured to facilitate a location signal transmission operation associated with at least said second portion of said plurality of transmitters to operatively initiate transmission of said additional plurality of location signals.

57. An apparatus for use in a mobile device positioning system, the apparatus comprising:
means for storing a plurality of measurements associated with a plurality of location signals as received by a mobile device from at least a first portion of a plurality of transmitters; and
means for dynamically establishing at least one location signal transmission parameter based, at least in part, on said plurality of measurements, said at least one location signal transmission parameter configured to facilitate at least a second portion of said plurality of transmitters to operatively initiate subsequent transmission of an additional plurality of location signals configured to be received by said mobile device, and
wherein said rate parameter is configured to initiate at least one transmitter in said second portion of said plurality of transmitters to transmit at least one of said additional plurality of location signals, said at least one of said additional plurality of location signals comprising a Highly Detectable Pilot (HDP) signal and/or an Idle Period Down Link (IPDL) pilot signal.

58. The apparatus for use in a mobile positioning system, the apparatus comprising:
means for storing a plurality of measurements associated with a plurality of location signals as received by a mobile device from at least a first portion of a plurality of transmitters;
means for dynamically establishing at least one location signal transmission parameter based, at least in part, on said plurality of measurements, said at least one location signal transmission parameter configured to facilitate at least a second portion of said plurality of transmitters to operatively initiate subsequent transmission of an additional plurality of location signals configured to be received by said mobile device;
means for estimating a location of said mobile device based, at least in part, on said plurality of measurements;
means for determining a dilution of precision (DOP) and/or a number of geographically distinctive transmitters (NGDT) associated with said estimated location and said first portion of said plurality of transmitters; and
means for establishing a rate parameter associated with a location signal transmission operation based, at least in part, on said DOP and/or said NGDT.

59. The apparatus as recited in claim 58, further comprising means for establishing said rate parameter based, at least in part, on said DOP and a threshold DOP, and/or said $N_{GDT}$ and a threshold $N_{GDT}$, said threshold DOP and/or said threshold $N_{GDT}$ being associated with an acceptable or minimum number of transmitters to be included within said second portion.

60. A method performed by a network resource for use in a mobile device positioning system, the method comprising:
obtaining at least one location signal transmission parameter based, at least in part, on a plurality of measurements associated with a plurality of location signals, the at least one location signal transmission parameter configured to facilitate at least a second portion of a plurality of transmitters to operatively initiate subsequent transmission of an additional plurality of location signals configured to be received by a mobile device; and providing the at least one location signal transmission parameter to at least the second portion of the plurality of transmitters over the network.

61. The method of 60, wherein the obtaining step includes:
receiving the at least one location signal transmission parameter from the mobile device.

62. The method of 60, wherein the obtaining step includes:
dynamically establishing the at least one location signal transmission parameter at the mobile device.

63. The method of claim 60, wherein the obtaining step comprises:
receiving the plurality of measurements from the mobile device; and
dynamically establishing the at least one location signal transmission parameter based, at least in part, on the plurality of measurements.

* * * * *